(12) United States Patent
Chapman

(10) Patent No.: US 6,932,593 B2
(45) Date of Patent: Aug. 23, 2005

(54) METHOD OF PREHEATING CATALYTIC HEATER

(75) Inventor: Michael J. Chapman, Portsmouth, RI (US)

(73) Assignee: New England Catalytic Technologies, Inc., Portsmouth, RI (US)

( * ) Notice: Subject to any disclaimer, the term of this patent is extended or adjusted under 35 U.S.C. 154(b) by 4 days.

(21) Appl. No.: 10/307,604

(22) Filed: Dec. 3, 2002

(65) Prior Publication Data

US 2003/0129557 A1 Jul. 10, 2003

Related U.S. Application Data

(60) Provisional application No. 60/334,405, filed on Dec. 3, 2001.

(51) Int. Cl.[7] ............................................... F23D 14/18
(52) U.S. Cl. ......................................... 431/6; 431/328
(58) Field of Search .............................. 431/6, 12, 268, 431/326–329

(56) References Cited

U.S. PATENT DOCUMENTS 3,681,002 A * 8/1972 Weller et al. ................ 431/268
3,982,878 A * 9/1976 Yamane et al. ............... 431/12
6,045,355 A * 4/2000 Chapman et al. ............ 431/329

FOREIGN PATENT DOCUMENTS

JP 6-11119 A * 1/1994 ........... F23D/14/18

* cited by examiner

*Primary Examiner*—Sara Clarke
(74) *Attorney, Agent, or Firm*—John R. Doherty

(57) ABSTRACT

The invention provides a method of preheating a catalyst in a catalytic heater comprising the steps of preparing a gaseous mixture of hydrogen and nitrogen in a volume ratio of between about 95% hydrogen to about 5% nitrogen and about 5% hydrogen to about 95% nitrogen and dispersing the gaseous mixture into contact with the catalyst for a period of time sufficient to raise the temperature of the catalyst to a level that will promote the flameless oxidation of a fuel gas in the presence of the catalyst.

16 Claims, 1 Drawing Sheet

METHOD OF PREHEATING CATALYTIC HEATER

This application claims priority to my earlier filed provisional application Ser. No. 60/334,405, filed on Dec. 3, 2001.

FIELD OF THE INVENTION

This invention relates generally to catalytic heaters and more particularly to a method of preheating catalytic heaters.

BACKGROUND OF THE INVENTION

In a catalytic heater, heat is produced when a gaseous fuel is brought into contact with a catalyst in the presence of air containing a normal level of oxygen. Typically, the fuels are natural gas, propane and butane, for example.

Generally, the combustible gas or fuel is fed through the bottom of the catalytic heater and is dispersed at atmospheric pressure into contact with a porous active layer. This layer contains the catalyst which may be platinum, for example. Oxygen from the atmosphere enters the porous catalytic layer and reacts with the gaseous fuel, promoted by the catalyst. This reaction releases the BTU content in the fuel in the form of radiant energy. Catalytic heaters are therefore used as a source for infrared heat. The chemical reaction that occurs during the oxidation reduction process produces temperatures within the catalyst of from about 500 to 1000 degrees Fahrenheit (F). The actual temperature at the surface of catalytic heater is dependent upon the rate at which the fuel gas is introduced to the catalyst. The surface of the heater is typically rectangular or circular and ranges from about one square foot to about 10 square feet. The volume of the gas delivered to the catalytic surface may range from about 2 to 6 cubic feet of gas per hour per square foot.

Before a catalytic heater can be operated successfully, the heater and more particularly the catalyst must be preheated to a temperature at which the oxidation reaction can be sustained. At the present, most all catalytic heaters use an electric resistance tubular heater (calrod) to preheat the platinum catalyst before the gas is introduced into the heater. However, some manufactures of catalytic heaters are attempting to use methods of preheating the catalyst other than with an electrical element. These methods include a flame pilot light that impinges the internal or external surface of the catalyst, raising its temperature high enough for the catalyst to flamelessly oxidize the incoming gas fuel. Another method consists of ducting hot air in close proximity to the catalyst, raising the temperature sufficiently to react the incoming gas fuel.

SUMMARY OF THE INVENTION

It has been discovered in accordance with the invention that the temperature of the catalyst in a catalytic heater can be effectively raised to the required level to react with an incoming fuel by contacting the catalyst with a gaseous mixture composed essentially of hydrogen and nitrogen. It has been found that mixing the hydrogen with nitrogen effectively lowers the temperature of reaction with the catalyst, creating a safe method for preheating the catalyst.

Further, in accordance with the invention, it has been discovered that to be most effective the gaseous mixture should be maintained in a volume ratio of between about 95% hydrogen to about 5% nitrogen and about 5% hydrogen to about 95% nitrogen at ambient conditions. Preferably, although not necessarily, the gaseous mixture of hydrogen and nitrogen may be introduced into the catalytic heater through the existing gas inlets that are employed to control the heater in normal operation.

More specifically then, the invention provides a new and improved method of preheating a catalyst in a catalytic heater comprising the steps of:

preparing a gaseous mixture of hydrogen and nitrogen in a volume ratio of between about 95% hydrogen to about 5% nitrogen and about 5% hydrogen to about 95% nitrogen at ambient conditions, and dispersing the gaseous mixture into contact with the catalyst for a period of time sufficient to raise the temperature of the catalyst to a level that will promote the flameless oxidation of a fuel gas in the presence of the catalyst at ambient conditions.

The catalyst is preferably a platinum catalyst incorporated within a porous insulating layer. The porous insulating layer is exposed on one side to the ambient atmosphere and on the opposite or interior side to the flow of fuel gas from a suitable dispersing medium. The dispersing medium may be a dispersion plate having a plurality of substantially equally spaced apart holes for uniformly dispersing the gaseous mixture and fuel gas into contact with the insulating layer containing the catalyst. The gaseous mixture and fuel gas may be supplied through a plenum chamber located at the bottom of the catalytic heater. The plenum chamber is provided with the necessary inlets for introducing both the gaseous mixture and fuel gas.

It has been further found in accordance with the invention that the starting gaseous mixture can be most effectively and uniformly distributed into contact with the catalyst by passing the mixture through a porous baffling medium, such as an open metal mesh or screen, positioned between the dispersion plate and the porous insulating layer. The baffling medium serves to distribute the gaseous mixture evenly over the whole area of the catalyst-containing insulating layer so that the entire catalyst can be quickly and most efficiently brought to operating temperature before the fuel gas is introduced.

DESCRIPTION OF THE PREFERRED EMBODIMENTS

Figure 1:
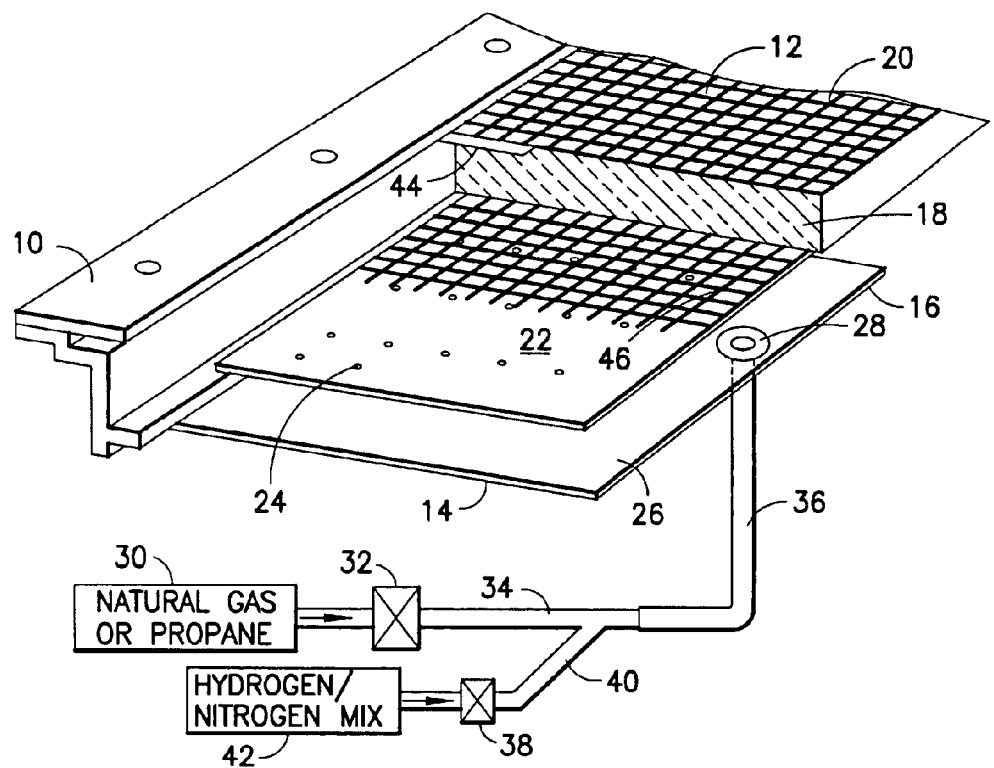
FIG. 1 is a partially cut-away, perspective view of a section of a catalytic heater showing the gas inlet manifold system used for feeding the fuel gas into the catalytic heater as well as the preheat or starting gas mixture in accordance with the invention.
Figure 2:
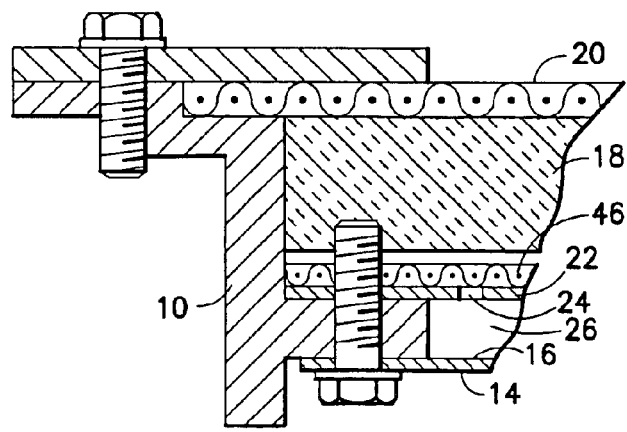
FIG. 2 is a cross-sectional view of the body or frame portion of the catalytic heater showing the construction of the plenum chamber, dispersion plate and baffling medium for distributing the fuel gas to the interior of the heater.

Referring to the drawing, there is shown a catalytic heater of a preferred type to which the preheating method of the invention is particularly suited. As shown, the catalytic heater comprises a body or frame 10 of a somewhat "Z" shaped configuration having an open end 12 and an opposite end 14 closed by a back plate 16. Disposed within the open end 12 is an insulating layer 18 incorporating a catalyst, such as platinum, along with an open grill 20 made of stainless steel, for example, which is mounted on top of the insulating layer 18. Below the insulating layer 18 is a metal dispersion plate 22 having therein a plurality of tiny holes 24 substantially uniformly spaced apart over the surface of the plate. The dispersion plate 22 is spaced apart from the back plate 16 a suitable distance to form a sealed plenum chamber 26. A gas inlet 28 is provided within the back plate 16 to allow for the passage of a fuel gas, such as natural or propane gas, for example, from a suitable supply, such as a gas tank 30.

The fuel gas is fed from the supply through a main operating valve 32 and a conduit 34 connected to the gas inlet 28 via a hose pipe 36, for example. The fuel gas enters the sealed plenum chamber 26 at a predetermined pressure and is substantially uniformly disbursed throughout the insulating layer 18 by the plurality of holes 24 in the dispersion plate 22 and contacts the catalyst. Oxygen from the atmosphere enters the heater through the open end 12, passing through the grill 20 and the insulating layer 18 and reacts with the gaseous fuel, promoted by the catalyst, at substantially ambient conditions. This reaction releases the BTU content in the fuel in the form of radiant heat.

Before the radiant heat producing reaction can occur, it is necessary to preheat the catalyst to a temperature which is high enough for the catalyst to flamelessly oxidize the incoming fuel gas. In the past, as indicated above, this has been achieved by use of an electric resistance heater or a flame pilot light, for example.

It has been found in accordance with the invention that a gas mixture composed of substantially pure (e.g. 99%) hydrogen and nitrogen can be used to start a catalytic heater before the fuel gas is introduced. The starter mixture when introduced into a catalytic heater safely raises the catalyst temperature to the required level to react with the incoming fuel gas to start the heater. Hydrogen gas has a unique property in that when it comes into contact with platinum at room temperature, it will instantly oxidize with the platinum, releasing heat. The reaction is generally so violent that a stream of 99% pure hydrogen impinging on the catalyst will create a temperature on the catalyst that causes the hydrogen stream to burn, the auto ignition point of hydrogen being about 800 degrees F.

It has been discovered, however, in accordance with the invention that this reaction can be safely tempered for use in preheating a catalytic heater by mixing the hydrogen with nitrogen in a predetermined volume ratio and then feeding the mixture into contact with the catalyst. The volume ratio of hydrogen to nitrogen in the mixture should be between about 95% hydrogen to about 5% nitrogen and about 5% hydrogen to about 95% nitrogen at ambient conditions. Preferably, the volume ratio is maintained between about 60% hydrogen to about 40% nitrogen and about 40% hydrogen to about 60% nitrogen at ambient conditions. In actual practice, the volume ratio may often vary depending upon the ambient and seasonal conditions. For example, during the winter months, the preferred volume ratio is about 60% hydrogen to about 40% nitrogen while during the summer months, the preferred volume ratio is about 50% hydrogen to about 50% nitrogen.

Although it may be possible to feed the mixture into contact with the catalyst in a number of different ways, it is preferred to introduce the mixture into the heater using the existing fuel gas inlet system.

To this end, a second or preheat valve 38 is provided in accordance with the invention in a separate conduit 40 connected between the main valve 32 and the gas inlet 28. Thus, during start-up of the catalytic heater, the main valve 32 is kept closed and the preheat valve 38 is opened to allow the hydrogen and nitrogen mixture to flow from a suitable supply, such as a mixing tank 42, into the plenum chamber 26 and thence through the insulating layer 18 into contact with the catalyst. It should be noted that while only a single inlet valve 28 is shown in the drawing, the gas inlet means may comprise separate or multiple gas inlets for both the starting gas mixture and the fuel gas as will readily occur to those skilled in the art.

To facilitate the preheating method of the invention, there is also provided in accordance with the invention a thermocouple 44 or other temperature sensing device located in proximity to the insulating layer 18. The temperature of the initial reaction of the hydrogen/nitrogen mix is sensed via the thermocouple 44 and after as little as two minutes, the reaction will have reached a stable temperature. At that point, the hydrogen/nitrogen mix is turned off by closing the preheat valve 38 and opening the main operating valve 32. This in turn purges the remainder of the hydrogen/nitrogen mix through the catalyst, maintaining the reaction until the main fuel arrives and is subsequently flamelessly oxidized. The main fuel is fed into the heater at a maximum rate for a given heater for about 2 to 5 minutes, ensuring that the reaction is well established.

In order for the preheat method of the invention to work effectively, the gas mixture should be evenly disbursed across the catalyst surface. This is readily achieved by employing a baffling medium such as a metal mesh or screen 46 positioned adjacent to the dispersion plate 22 and the plenum chamber 26, as disclosed in my U.S. Pat. No. 6,045,355 issued on Apr. 4, 2000, entitled "Gas Catalytic Heaters With Improved Temperature Distribution", the disclosure of which is incorporated herein by reference. However, it will be understood that catalytic heaters using other methods for uniformly dispersing the fuel gas may work as well, albeit not as efficiently, taking longer for the reaction to spread across the catalyst surface.

It will thus be seen that by using a blend or gas mixture of nitrogen and hydrogen in the volume ratios mentioned herein above effectively controls the richness of the hydrogen and hence the temperature of reaction while creating a gas that is easily distributed through existing manifolds and gas controls for the catalytic system. Moreover, this mix more closely resembles the density properties of natural gas as opposed to those of 99% pure hydrogen gas.

What is claimed is:

1. A method of preheating a catalyst in a catalytic heater comprising the steps of:

preparing a gaseous mixture of hydrogen and nitrogen wherein the volume ratio of hydrogen to nitrogen is between about 60% hydrogen to about 40% nitrogen and about 40% hydrogen to about 60% nitrogen; and dispersing said gaseous mixture into contact with said catalyst for a period of time sufficient to raise the temperature of said catalyst to a level that will promote oxidation of a fuel gas in the presence of said catalyst.

2. A method of preheating a catalyst according to claim 1, wherein said volume ratio in said gaseous mixture is about 60% hydrogen to about 40% nitrogen.

3. A method of preheating a catalyst according to claim 1, wherein said volume ratio in said gaseous mixture is about 50% hydrogen to about 50% nitrogen.

4. A method of preheating a catalyst according to claim 1, further including the steps of incorporating said catalyst within a porous insulating layer exposed on one side to the ambient atmosphere and dispersing said gaseous mixture through said porous insulating layer and into contact with said catalyst.

5. A method of preheating a catalyst according to claim 4, further including the step of dispersing said gaseous mixture through a plurality of substantially equally spaced apart holes in a dispersion plate located below said opposite side of said insulating layer.

6. A method of preheating a catalyst according to claim 5, further including the step of feeding said gaseous mixture through a plenum chamber before being dispersed through said holes in said dispersion plate.

7. A method of preheating a catalyst according to claim 6, further including the step of passing said gaseous mixture through a baffling medium between said dispersion plate and said insulating layer.

8. A method of starting a catalytic heater in which a fuel gas is fed into contact with a catalyst through a first valve, comprising the steps of:

closing said first valve;

preparing a gaseous mixture containing hydrogen and nitrogen wherein the volume ratio of hydrogen to nitrogen is between about 60% hydrogen to about 40% nitrogen and about 40% hydrogen to about 60% nitrogen;

feeding said gaseous mixture into contact with said catalyst through a second valve for a period of time sufficient to raise the temperature of said catalyst to a level that will promote oxidation of said fuel gas in the presence of said catalyst; and closing said second valve when the temperature of said catalyst reaches said level and then opening said first valve to allow said fuel gas to flow into contact with said catalyst.

9. A method of preheating a catalyst according to claim 8, wherein said volume ratio in said gaseous mixture is about 60% hydrogen to about 40% nitrogen.

10. A method of preheating a catalyst according to claim 9, wherein said volume ratio in said gaseous mixture is about 50% hydrogen to about 50% nitrogen.

11. A method of preheating a catalyst according to claim 8, further including the steps of incorporating said catalyst within a porous insulating layer exposed on one side to the ambient atmosphere and dispersing said gaseous mixture through said porous insulating layer and into contact with said catalyst.

12. A method of preheating a catalyst according to claim 11, further including the step of dispersing said gaseous mixture through a plurality of substantially equally spaced apart holes in a dispersion plate located below said opposite side of said insulating layer.

13. A method of preheating a catalyst according to claim 12, further including the step of feeding said gaseous mixture through a plenum chamber before being dispersed through said holes in said dispersion plate.

14. A method of preheating a catalyst according to claim 13, further including the step of passing said gaseous mixture through a baffling medium between said dispersion plate and said insulating layer.

15. A gas catalytic heater comprising, in combination:

a body;

a catalytically active porous layer disposed within said body;

a sealed plenum chamber having a gas permeable portion facing toward said catalytically active layer;

a first supply of a combustible fuel gas;

a second supply of a starting gas mixture composed of hydrogen and nitrogen wherein the volume ratio of hydrogen to nitrogen is between about 60% hydrogen to about 40% nitrogen and about 40% hydrogen to about 60% nitrogen;

gas inlet means for introducing said fuel gas and said starting gas mixture into said plenum chamber;

a first gas conduit means connecting said first supply to said gas inlet means;

a second gas conduit means connecting said second supply to said gas inlet means;

a first valve means associated with said first gas conduit for opening and closing said first supply to the flow of said fuel gas to said inlet means; and a second valve means associated with said second gas conduit for opening and closing said second supply to the flow of said starting gas mixture to said inlet means.

16. A gas catalytic heater according to claim 15, wherein a baffling medium is provided between said gas permeable portion of said plenum chamber and said porous insulating layer.

* * * * *